(12) United States Patent
Ignaczak et al.

(10) Patent No.: US 10,935,172 B2
(45) Date of Patent: Mar. 2, 2021

(54) PIPE CLAMP AND PIPE JOINT WITH SENSOR ACCOMMODATION

(71) Applicant: Norma U.S. Holding LLC, Auburn Hills, MI (US)

(72) Inventors: Brian T. Ignaczak, Rochester, MI (US); Brian T. Geese, Clarkston, MI (US); Manuel Baudoin, Newbury (GB); Belal Akremi, Newbury (GB); Mateusz Jarosz, Thatcham (GB); Tatjana Rumbauskiene, Thatcham (GB)

(73) Assignee: Norma U.S. Holding LLC, Auburn Hills, MI (US)

( * ) Notice: Subject to any disclaimer, the term of this patent is extended or adjusted under 35 U.S.C. 154(b) by 347 days.

(21) Appl. No.: 15/914,863

(22) Filed: Mar. 7, 2018

(65) Prior Publication Data

US 2018/0259103 A1    Sep. 13, 2018

Related U.S. Application Data

(60) Provisional application No. 62/468,056, filed on Mar. 7, 2017.

(51) Int. Cl.
| | |
|---|---|
| *F16L 23/08* | (2006.01) |
| *F01N 13/18* | (2010.01) |
| *F01N 13/00* | (2010.01) |
| *F16L 41/00* | (2006.01) |

(52) U.S. Cl.
CPC ............ *F16L 23/08* (2013.01); *F01N 13/008* (2013.01); *F01N 13/1805* (2013.01); *F01N 13/1844* (2013.01); *F16L 41/008* (2013.01)

(58) Field of Classification Search
CPC . F16L 23/08; F16L 23/10; F16L 17/04; F16L 21/06; F16L 41/008; F16L 33/04; F16B 2/08; F01N 13/1805; F01N 13/1844; F01N 13/008
USPC ....... 285/197, 198, 199, 364, 365, 373, 406, 285/407, 419; 24/279
See application file for complete search history.

(56) References Cited

U.S. PATENT DOCUMENTS

| | | | | |
|---|---|---|---|---|
| 3,362,730 | A | * | 1/1968 | St Clair ................. F16L 17/04 |
| 3,971,573 | A | | 7/1976 | Clements |
| 5,697,650 | A | * | 12/1997 | Brown ......................... 285/373 |
| 7,533,910 | B2 | | 5/2009 | Ma et al. |
| 9,103,476 | B2 | | 8/2015 | Geese et al. |

(Continued)

FOREIGN PATENT DOCUMENTS

| | | |
|---|---|---|
| CN | 2401765 Y | 10/2000 |
| CN | 200946730 Y | 9/2007 |

(Continued)

OTHER PUBLICATIONS

International Search Report and Written Opinion for Application No. PCT/US2018/021393 dated Jun. 22, 2018, 10 pages.

(Continued)

*Primary Examiner* — Zachary T Dragicevich
(74) *Attorney, Agent, or Firm* — Reising Ethington, P.C.

(57) ABSTRACT

A pipe clamp is used to connect pipe ends together and thereby establish a pipe joint. The pipe clamp and pipe joint are designed and constructed to accommodate a sensor bung and/or a sensor equipped at one of the connected pipe ends. The pipe clamp and pipe joint can be of an automotive exhaust application.

20 Claims, 9 Drawing Sheets

(56) References Cited

U.S. PATENT DOCUMENTS

| | | | |
|---|---|---|---|
| 9,194,523 B2 | 11/2015 | Ignaczak et al. | |
| 2002/0166214 A1* | 11/2002 | Wachter | F16L 21/065 |
| 2003/0226412 A1 | 12/2003 | Rumminger et al. | |
| 2015/0008663 A1* | 1/2015 | Drivon | F16L 23/08 |
| 2015/0107379 A1 | 4/2015 | Rose et al. | |
| 2015/0167872 A1 | 6/2015 | von Breitenbach et al. | |
| 2015/0377399 A1* | 12/2015 | Vachon | |
| 2016/0161341 A1 | 6/2016 | Yumoto | |
| 2017/0089376 A1* | 3/2017 | Muntasser | |
| 2020/0032695 A1 | 1/2020 | Bean | |
| 2020/0149569 A1 | 5/2020 | Haddadian et al. | |

FOREIGN PATENT DOCUMENTS

| | | |
|---|---|---|
| CN | 104712620 A | 6/2015 |
| DE | 20213615 U1 | 11/2002 |
| KR | 101545150 B1 | 8/2015 |
| KR | 101583597 B1 | 1/2016 |
| WO | WO2018172769 A1 | 9/2018 |
| WO | WO2019011463 A1 | 1/2019 |

OTHER PUBLICATIONS

Chinese Office Action for Chinese Application No. 201880016988.7 dated Aug. 14, 2020 (4 pages).
Chinese Search Report for Chinese Application No. 201880016988.7 dated Aug. 14, 2020 (3 pages).
English Translation of Chinese Office Action for Chinese Application No. 201880016988.7 dated Aug. 14, 2020 (6 pages).
Extended European Search Report and Written Opinion for EP Application No. 18763446.4 dated Nov. 17, 2020 (8 pages).

* cited by examiner

PIPE CLAMP AND PIPE JOINT WITH SENSOR ACCOMMODATION

CROSS-REFERENCE TO RELATED APPLICATION

This application claims the benefit of U.S. Provisional Patent Application No. 62/468,056, filed Mar. 7, 2017, the entire contents of which are hereby incorporated by reference.

TECHNICAL FIELD

This disclosure relates generally to pipe clamps used to connect pipe ends together and establish a pipe joint thereat, and, more particularly, to pipe clamps and pipe joints in applications with sensors employed to measure one or more properties of fluid-flow traveling through the pipe ends.

BACKGROUND

Pipe clamps are typically used to connect pipe ends together and establish a pipe joint that is fluid-tight and resists axial separation. In automotive exhaust applications, pipe clamps are commonly installed at different locations and between different components of the exhaust system for handling the conveyance of exhaust gases emitted from an internal combustion engine. For instance, a pipe clamp can be installed between a turbocharger and a catalytic converter of the exhaust system. Near these types of locations, sensors are often equipped in order to measure one or more properties of the exhaust gas travelling through the components. Nitrogen oxide ($NO_x$) sensors, for example, are sometimes used to detect nitrogen oxides in the exhaust gas travelling downstream of the turbocharger and upstream of the catalytic converter. Of course, other types of sensors are equipped at other locations and between other components.

SUMMARY

In an embodiment, a pipe joint may include a first pipe end, a second pipe end, and a pipe clamp. The first pipe end has a first flange, and the second pipe end has a second flange. The second pipe end also has a sensor bung. The pipe clamp is situated on the first and second pipe ends at the first and second flanges thereof. The pipe clamp may include a band, a bridge, and a fastener. The band has one or more band segments, and in particular has a first band segment and a second band segment. The bridge spans between the first and second band segments and is attached to the first and second band segments. The bridge has a clearance that accommodates a sensor bung, accommodates a sensor, or accommodates both a sensor bung and a sensor. The fastener is used to tighten the pipe clamp on the first and second pipe ends.

In another embodiment, a pipe clamp may include a v-band, a bridge, and a tightening assembly. The v-band has at least a first band segment and a second band segment, and has a first lug and a second lug. The bridge spans between the first and second band segments and is attached to the first and second band segments. The bridge has a clearance that accommodates a sensor bung, accommodates a sensor, or accommodates both a sensor bung and a sensor. The tightening assembly includes a fastener that is used to bring the first and second lugs toward each other.

In yet another embodiment, a pipe joint may include a first pipe end, a second pipe end, and a pipe clamp. The first pipe end has a first flange, and the second pipe end has a second flange. The second pipe end also has a sensor bung. The pipe clamp is situated on the first and second pipe ends at the first and second flanges thereof. The pipe clamp may include a band and a tightening assembly. The band has a first lug and a second lug. The tightening assembly includes a fastener and an extension. The extension is used to bring the first and second lugs toward each other to tighten the pipe clamp. In installation, the band is tightened over the first and second flanges, and the sensor bung resides in a spacing between the first and second lugs. The extension interacts with the first lug, with the second lug, or with both the first and second lugs in order to bring the first and second lugs toward each other when tightening the pipe clamp.

BRIEF DESCRIPTION OF THE DRAWINGS

Embodiments of the disclosure are described with reference to the appended drawings, in which.

DETAILED DESCRIPTION

Figure 1:
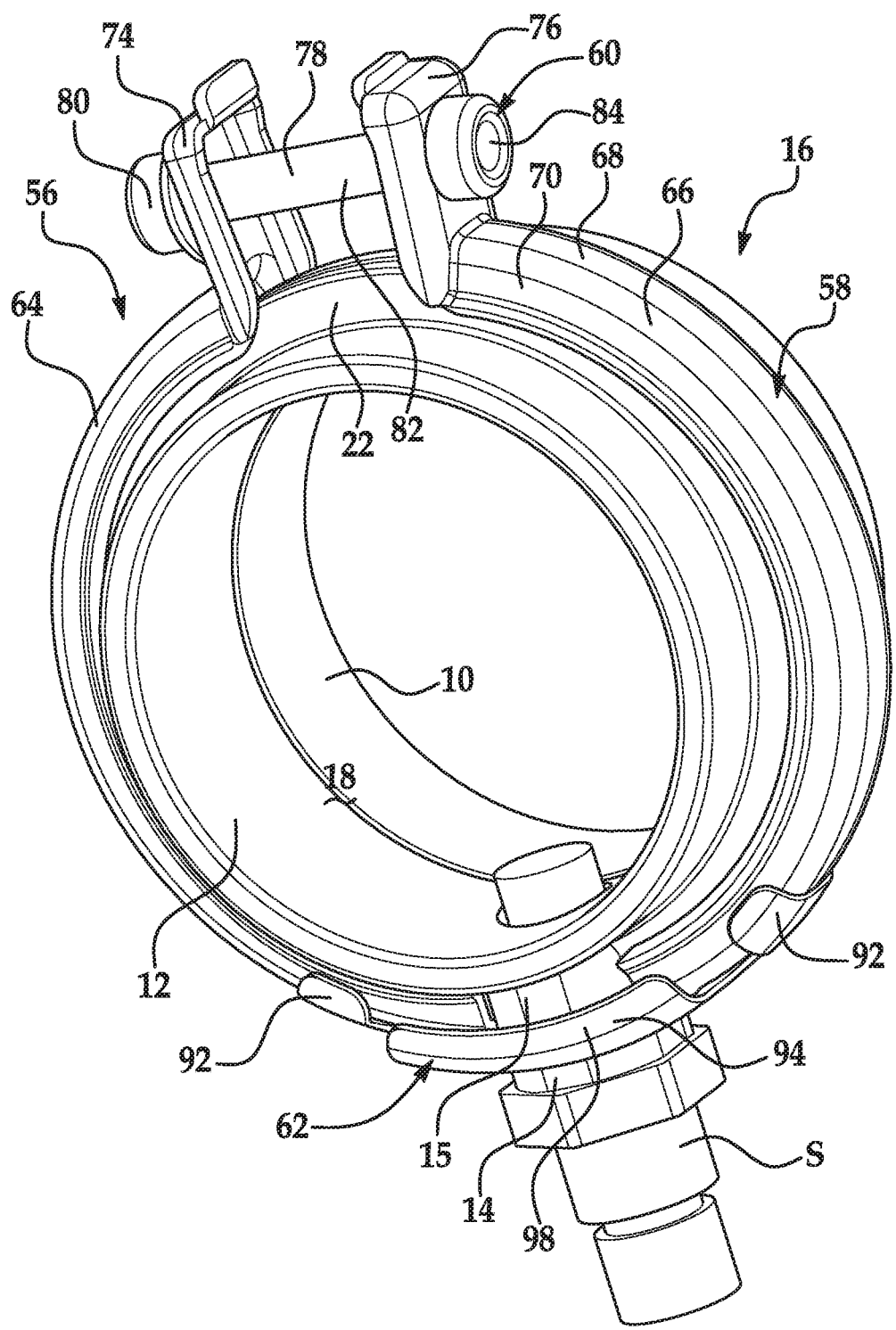
FIG. 1 is a perspective view of an embodiment of a pipe clamp and a pipe joint.

Referring to the drawings, several embodiments of a pipe clamp are depicted that are used to connect pipe ends together and establish a pipe joint that is fluid-tight and that resists axial separation. The pipe clamps and pipe joints are designed and constructed to accommodate a sensor bung and/or a sensor equipped at one of the pipe ends, while still maintaining an effective fluid-tight seal at the pipe ends and satisfying packaging demands in the larger application. This description and the drawings present the pipe clamps and pipe joints in the context of an automotive exhaust application, but the pipe clamps and joints are also suitable for use in aircraft pipes, marine pipes, as well as pipes in other applications. Furthermore, unless otherwise specified, the terms radially, axially, and circumferentially, and their grammatical variations refer to directions with respect to the generally circular and somewhat cylindrical shape of the pipe clamps and pipe joints.

As mentioned, the pipe clamps can be used to establish a joint in an automotive exhaust system. In one example, and referring to FIGS. 1-3, a first pipe end 10 can be of a turbocharger housing or can be a separate and distinct part attached to a turbocharger housing, and a second pipe end 12 can be of a catalytic converter housing or can be a separate and distinct part attached to a catalytic converter housing. Here, the first pipe end 10 is an outlet of the turbocharger housing or fluidly communicates therewith, and the second pipe end 12 is an inlet of the catalytic converter housing or fluidly communicates therewith. In this regard, the phrase "pipe end" is utilized herein in a broad sense to cover pipe ends, pipe segments, and housing outlet and inlet regions, among other possibilities. Exhaust gases hence flow from the turbocharger housing, through the first pipe end 10, through the second pipe end 12, and to the catalytic converter housing.

The first and second pipe ends 10, 12 are designed and constructed to incorporate a sensor bung 14 situated at or near a pipe joint 16 established between the first and second pipe ends 10, 12. The sensor bung 14 can be of different types and can have different designs and constructions. In the example of the figures, the sensor bung 14 has a generally hexagonal shape with an outer surface 15 and an inside bore 17. The sensor bung 14 receives a sensor S at its inside bore 17, such as a nitrogen oxide ($NO_x$) sensor. When put in use, and referring in particular to FIG. 3, the $NO_x$ sensor S is disposed in the sensor bung 14 with an end suspended at an interior 18 of the pipe joint 16 and exposed to exhaust gases flowing therethrough in order to detect nitrogen oxides in the exhaust gases. In the example here, the $NO_x$ sensor S also maintains exposure to the environment outside of the pipe joint's interior 18. Previously, sensor bungs were set back away from pipe ends and pipe joints, and have been welded on somewhat irregularly-shaped walls of catalytic converter housings, as but one example. Having sensor bungs at or too close to pipe ends and pipe joints, it was thought, would incorrigibly frustrate the efficacy of the fluid-tight seal thereat, as well as complicate the satisfaction of packaging constraints which are oftentimes inflexible in certain applications such as automotive applications. But welding sensor bungs to irregularly-shaped walls can present difficulties due to the irregular shapes involved. Instead, the sensor bung 14 of the figures is incorporated at or near the first and second pipe ends 10, 12. Still, this location of the sensor bung 14 is not without its own challenges which, as described below, have been resolved by the designs and constructions of the pipe ends and pipe clamps and pipe joints presented in the figures and detailed in this description.

Figure 3:
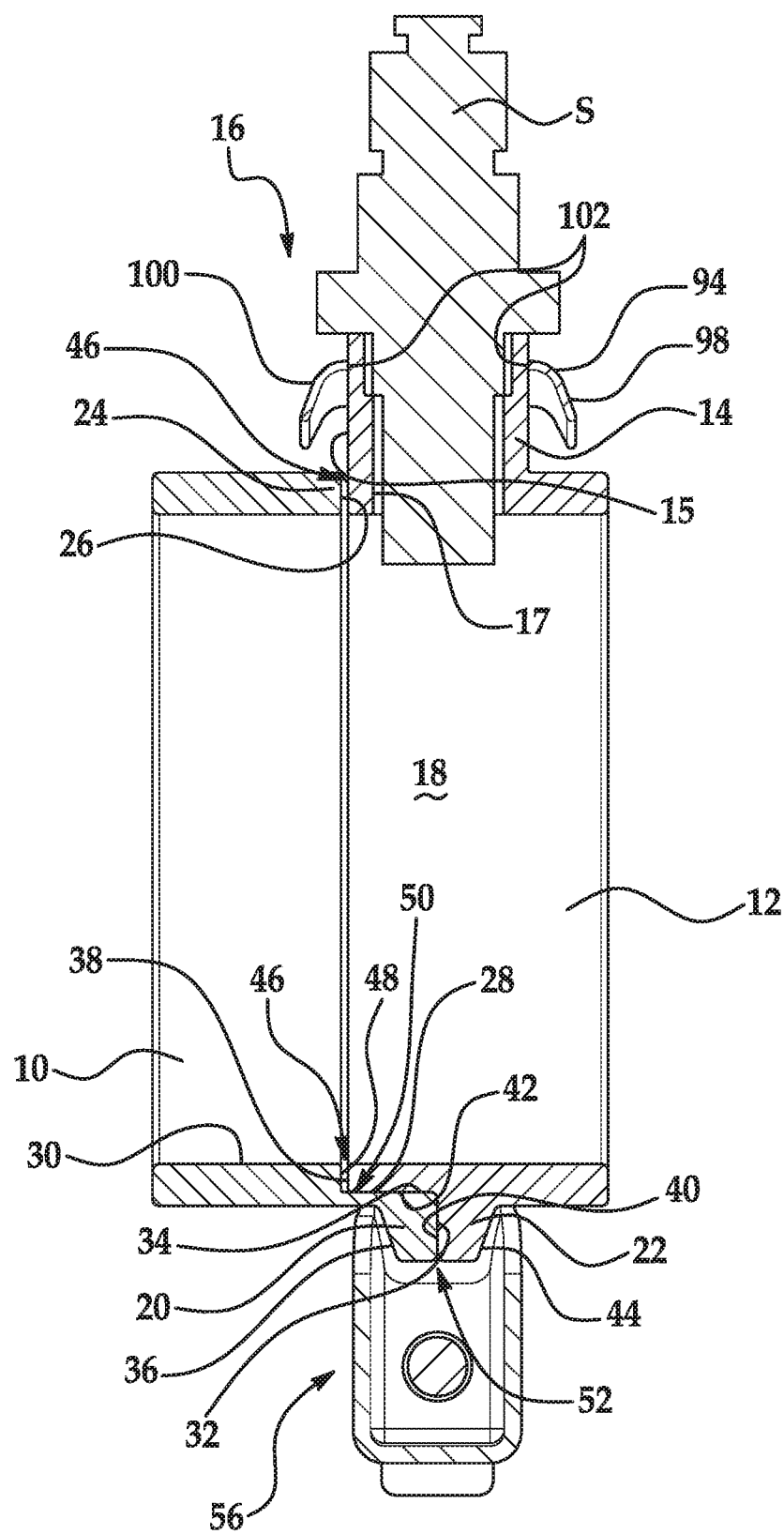
FIG. 3 is a sectional view of the pipe clamp and pipe joint of FIG. 1.

Still referring to FIG. 3, in this embodiment the first pipe end 10 has a first flange 20 and the second pipe end 12 has a second flange 22. The first and second flanges 20, 22 can have different designs and constructions in different embodiments, and in some cases can be altogether absent. In the example of the figures, the first flange 20 constitutes a terminal and free end region of the first pipe end 10, and spans around the first pipe end 10 for a majority of the first pipe end's circumference and is only absent at a circumferential zone 24 confronting and contiguous to the sensor bung 14 in installation. In other words, the first flange 20 discontinues its circumferential extent at the circumferential zone 24 where, in place of the first flange 20, a generally U-shaped notch is defined in the first pipe end 10. When the first and second pipe ends 10, 12 are brought together in an axial direction, the U-shaped notch receives the sensor bung 14. The circumferential zone 24 has a free end surface 26 directed axially outboard of the first pipe end 10, and is set back and situated axially inboard of a free end surface of the first flange 20. The first flange 20 has a ramp-like shape in cross-sectional profile, as perhaps depicted best by FIG. 3. At an underside of the first flange 20, a step 28 resides on an inside surface 30 of the first pipe end 10. The step 28 forms a surface 48 that is directed axially outboard of the first pipe end 10 and that is, in effect, a continuation of the free end surface 26 of the circumferential zone 24. As set forth below, this continuation of the surfaces 48, 26, establishes a circumferentially-continuous sealing interface in the pipe joint 16, as opposed to other interfaces of the first and second flanges 20, 22 that are circumferentially-discontinuous due to the sensor bung 14. Furthermore, the first flange 20 has a free end surface 32 directed axially outboard of the first pipe end 10, and has an inside surface 34 directed radially inboard of the first pipe end 10. At an exterior, the first flange 20 has an outer surface 36 that is slanted relative to an outer cylindrical surface of the first pipe end 10.

Similar to the first flange 20, the second flange 22 is located near a terminal and free end region of the second pipe end 12, and spans around the second pipe end 12 for a majority of the second pipe end's circumference and is only absent at a circumferential zone occupied by the sensor bung 14. In other words, the second flange 22 discontinues its circumferential extent at the circumferential zone where, in place of the second flange 22, the sensor bung 14 resides. At the circumferential zone, the sensor bung's outer surface 15 constitutes a free end surface of the second pipe end 12 thereat. The second flange 22 has a ramp-like shape in cross-sectional profile similar and complementary to the first flange 20, and resides at a location on the second pipe end 12 that is set back a small distance from a free end surface 38 of the second pipe end 12. The second flange 22 has an outboard surface 40 directed axially outboard of the second pipe end 12, and has an outside surface 42 directed radially outboard of the second pipe end 12. At an exterior, the second flange 22 has an outer surface 44 that is slanted relative to an outer circumferential surface of the second pipe end 12.

When the first and second pipe ends 10, 12 are brought axially together in installation, the first and second flanges 20, 22 interfit together. Still referring to FIG. 3, upon interfit, a primary sealing interface 46 is established between the free end surface 38 of the second pipe end 12 and the confronting surface 48 of the step 28 for a majority of the pipe ends' circumference, and is then established between the free end surface 26 of the circumferential zone 24 and the outer surface 15 of the sensor bung 14. By way of the surfaces 38, 48, 26, and 15, the sealing interface 46 spans circumferentially-continuously between and around the first and second pipe ends 10, 12. Indeed, in this embodiment, the sealing interface 46 is the sole surface-to-surface confronting interface between the first and second pipe ends 10, 12 that spans continuously around the circumferences of the first and second pipe ends 10, 12. Other interfaces of the first and second pipe ends 10, 12 do not span continuously around the circumferences thereof; for instance, an interface 50 between the inside surface 34 of the first flange 20 and the outside surface 42 of the second flange 22 is discontinuous at the sensor bung 14, and an interface 52 between the free end surface 32 of the first flange 20 and the outboard surface 40 of the second flange 22 is discontinuous at the sensor bung 14. The location of the sealing interface 46 is driven in part or more by the incorporation of the sensor bung 14, and is unlike previously-known flanged pipe joints in which the primary seal is formed between confronting face surfaces (here, surfaces 32 and 40) of the flanges.

A seal is formed at the sealing interface 46 that prevents exhaust gas leakage from the interior 18. In this embodiment, the seal is the sole seal formed between the first and second pipe ends 10, 12 at the pipe joint 16. The seal can be formed with or without a gasket at the sealing interface 46. Without a gasket, the seal is formed via surface-to-surface metal abutment between the free end surface 38 and the confronting surface 48 and between the free end surface 26 and the outer surface 15. With a gasket, the gasket can have a ring shape that fits within the complementary ring-shaped void defined at the sealing interface 46. The gasket could be composed of various materials depending on the application, including graphite, mica, metal, or another material; the exact material used for the gasket can be dictated by, among other considerations, the chemistry and the temperature of the exhaust gas travelling through the interior 18. In installation, the gasket is compressed and squeezed axially via the free end surface 38 and the confronting surface 48, and via the free end surface 26 and the outer surface 15. The amount of compression can impact the seal formed and its performance. For instance, if compressed too little, an effective seal might not be formed and maintained, as adequate surface-to-gasket abutment could be lacking at one or more points along the circumferential extent of the sealing interface 46. And conversely, if compressed too much, an effective seal might not be formed and maintained, as the gasket could more readily oxidize and deteriorate with greater surface area exposure outside of the sealing interface 46. In order to exercise control over the compression amount and help ensure an effective seal, certain dimensions of the design and construction of the first and second pipe ends 10, 12 and the first and second flanges 20, 22 can be predetermined. For example, the axial location and position of the free end surface 32 and the confronting surface 48 relative to each other, as well as the axial location and position of the outboard surface 40 and the free end surface 38 relative to each other, can increase or decrease the axial width of the void defined at sealing interface 46. In this sense, the interface 52 can serve as a compression limiter.

Figure 2:
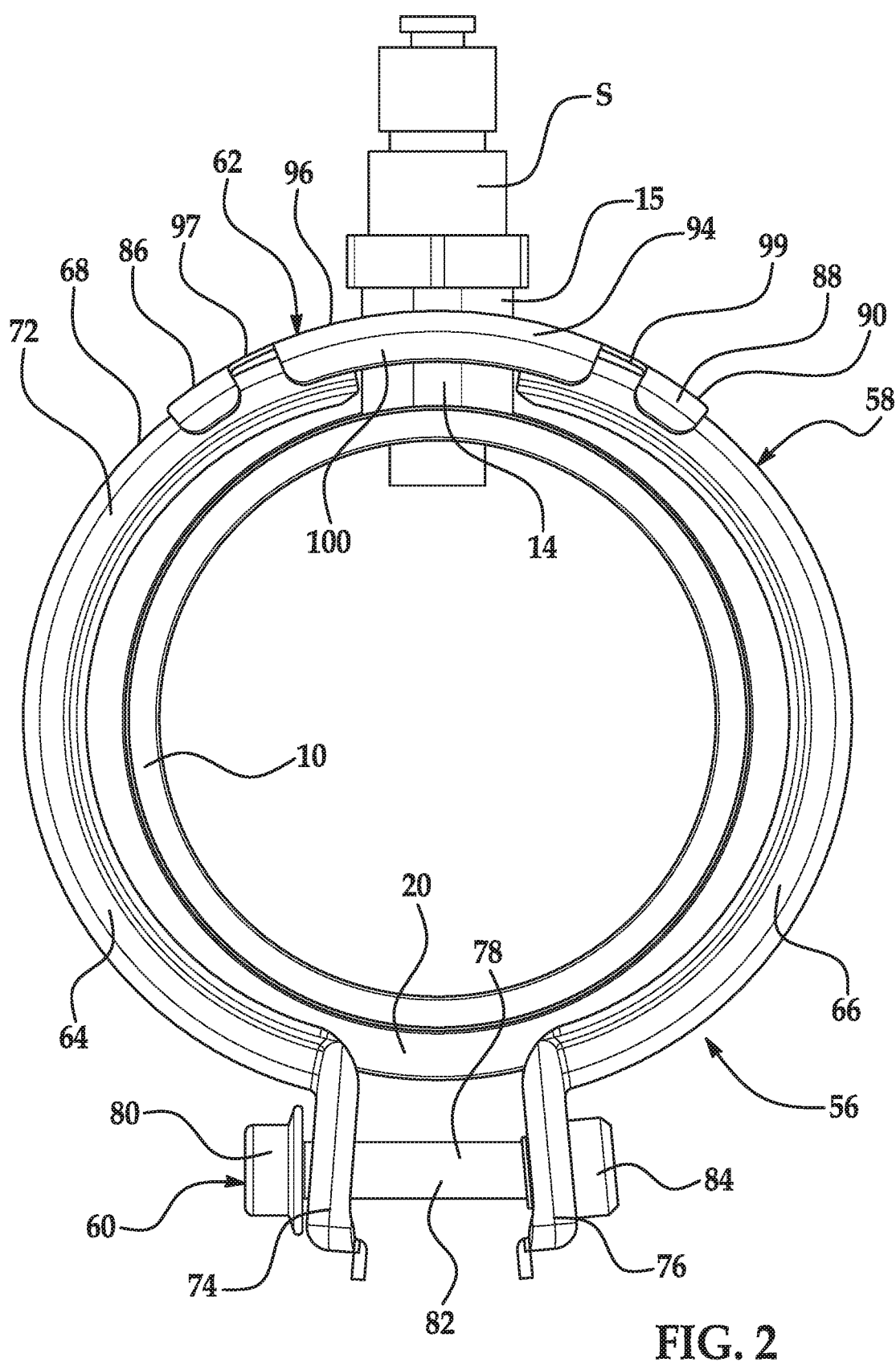
FIG. 2 is a side view of the pipe clamp and pipe joint of FIG. 1.

Still referring to the embodiment of FIGS. 1-3, a pipe clamp 56 is employed to connect the first and second pipe ends 10, 12 together and establish the pipe joint 16. The pipe clamp can have different designs and constructions in different embodiments, depending in part upon the application in which the pipe clamp is utilized. The example of the figures presents what-is-commonly-referred-to-as a v-clamp type of pipe clamp, but other types of pipe clamps are possible. Here, the pipe clamp 56 includes a band 58, a tightening assembly 60, and a bridge 62.

The band 58 can be made out of sheet metal that is stamped, bent, and/or undergoes other sorts of metalworking processes. In the v-clamp type, the band 58 is also called a v-band. The band 58 can be made up of one or more band segments—or v-band segments—that, when the pipe clamp 56 is tightened, work together to exert radial and axial forces on the first and second pipe ends 10, 12 and against the first and second flanges 20, 22. In the embodiment of FIGS. 1-3, the band 58 includes a pair of band segments: a first band segment 64 and a second band segment 66. The first and second band segments 64, 66 are coupled together via separate attachments to the bridge 62, and both interact with the tightening assembly 60. Each band segment 64, 66 spans a circumferential extent between a first circumferential end and a second circumferential end, and spans an axial extent between a first axial end and a second axial end. In cross-section each band segment 64, 66 has a generally V- and U-shaped profile. And each band segment 64, 66 has a base wall 68, a first side wall 70, and a second side wall 72. The first and second side walls 70, 72 are angled from the base wall 68 and slanted complementary to the outer surfaces 36, 44 of the first and second flanges 20, 22 for placement there-against in installation. At a circumferential end thereof, the first band segment 64 has a first lug 74 and the second band segment 66 has a second lug 76. The first and second lugs 74, 76 depend radially outboard of their respective band segment and have openings to receive parts of the tightening assembly 60.

The tightening assembly 60 is used to bring the first and second lugs 74, 76—and in turn the respective circumferential ends that the lugs depend from—toward and away from each other in order to tighten and loosen the band 58 and first and second band segments 64, 66 around the first and second flanges 20, 22. The tightening assembly 60 can have different designs and constructions and can be of different types. In the embodiment of the FIGS. 1-3, the tightening assembly 60 includes a fastener 78 and a nut 80. A shank 82 of the fastener 78 passes through the openings of the first and second lugs 74, 76, and a head 84 resides on an outside of one of the first or second lugs 74, 76. During rundown, the fastener 78 and nut 80 are tightened on each other and bring the first and second lugs 74, 76 toward each other. Still, in other embodiments the tightening assembly could be of the type disclosed in U.S. Pat. No. 7,441,311 assigned to Norma U.S. Holding LLC; and/or the pipe clamp 56 could include more than one tightening assemblies, such as a pair of tightening assemblies situated at different locations around the circumference of the band 58.

The bridge 62 is incorporated into the design and construction of the pipe clamp 56 in order to accommodate the location of the sensor bung 14 and the sensor S, and to safeguard the establishment of an effective fluid-tight seal at the pipe joint 16, while still meeting packaging demands in certain applications such as automotive applications. The bridge 62 can have different designs and constructions in different embodiments. In the embodiment of FIGS. 1-3, the bridge 62 serves to couple the first and second band segments 64, 66 together as an intermediate structure spanning therebetween. The bridge 62 has a generally arc shape and can be made out of sheet metal that is stamped, bent, and/or undergoes other sorts of metalworking processes, and is shown as a single and unitary structure that is a separate and discrete component from the first and second band segments 64, 66; in other embodiments, however, the bridge 62 could be a monolithic elongation of one or both of the band segments 64, 66.

In FIGS. 1-3, at a first circumferential end portion 86 the bridge 62 is attached, such as via spot-welding or another attachment technique, to a circumferential end of the first band segment 64. And at a second circumferential end portion 88 the bridge 62 is attached, again via spot-welding or some other technique, to a circumferential end of the second band segment 66. As illustrated in FIGS. 1 and 2, the circumferential ends of the first and second band segments 64, 66 adjacent these attachments are abutted against the sensor bung 14; while this is not necessary in all embodiments of the pipe clamp 56, in some cases it facilitates the establishment of sealing interfaces between the first and second flanges 20, 22 near the circumferential sides of the sensor bung 14. Relative to other components of the pipe clamp 56, the bridge 62 is situated one-hundred-and-eighty degrees (180°) from the tightening assembly 60 with respect to the circumference of the pipe clamp 56, as perhaps depicted best in FIG. 2. Having the bridge 62 and tightening assembly 60 positioned opposite each other like this can be beneficial in some embodiments and applications as the bridge 62 endures less force exerted by the tightening assembly 60 amid tightening of the pipe clamp 56 than it would if the bridge 62 were situated angularly closer to the tightening assembly 60. Each of the circumferential end portions 86, 88 is shaped generally to correspond to the shape of the band segments 64, 66 in order that a robust attachment can be made therebetween, though the shape can vary in different embodiments. The first and second circumferential end portions 86, 88 each have a base wall 90 and a pair of side walls 92 extending at an angle from opposite sides of the base wall 90. Residing between the first and second circumferential end portions 86, 88, the bridge 62 has a main body portion 94. The body portion 94 has a base wall 96 and a first and second side wall 98, 100 extending at an angle from opposite sides of the base wall 96. Measured from side-wall-to-side-wall, the base wall 96 has an axial extent greater than that of the base walls 68 of the first and second band segments 64, 66; this is because the axial measurement of the sensor bung 14 is greater than that of the combined first and second flanges 20, 22 in this embodiment. A first neck portion 97 extends between the first circumferential end portion 86 and the body portion 94, and a second neck portion 99 extends between the second circumferential end portion 88 and the body portion 94. The first and second neck portions 97, 99 have a reduced axial dimension compared to the circumferential end portions 86, 88 and body portion 94, and lack side walls like those of the first and second circumferential end portions 86, 88 and body portion 94. Because of their structure, the first and second neck portions 97, 99 tend to bend more readily in the radially-inboard direction, and hence lend more overall flexibility to the bridge 62 in this regard amid tightening.

To provide space for circumventing obstruction between the bridge 62—or more principally the pipe clamp 56—and the sensor bung 14, a clearance 102 is defined in the body portion 94. The clearance 102 receives introduction of the sensor bung 14 when the pipe clamp 56 is placed on the first and second pipe ends 10, 12 and at the first and second flanges 20, 22. In the embodiment of FIGS. 1-3, the clearance 102 is sized so that the sensor bung 14 fits within the clearance 102. The clearance 102 resides at a central region of the body portion 94 and spans axially between the first and second side walls 98, 100. The clearance 102 is defined and delimited by internal edges of the body portion 94; in other words, in this embodiment the clearance 102 is an opening framed within the physical form of the bridge 62. Still, in other embodiments the clearance 102 could accommodate and provide space for the sensor S if the sensor S and bridge 62 have a more immediate confrontation than that of the sensor bung 14 and bridge 62; further, the clearance 102 need not be wholly enclosed by internal edges of the body portion 94 and instead could have one or more open sides.

As described, the first and second pipe ends 10, 12 and the pipe clamp 56 have been designed and constructed to ensure a fluid-tight seal at the pipe joint 16, notwithstanding the incorporation of the sensor bung 14 at the first and second pipe ends 10, 12. The sealing interface 46 facilitates the formation of an effective seal around the entire circumference of the first and second pipe ends 10, 12 without breach, in this embodiment. And the addition of the bridge 62 within the design and construction of the pipe clamp 56 does not hamper the radial and axial forces exerted on the first and second pipe ends 10, 12 amid tightening of the pipe clamp 56. The bridge 62 exhibits an overall complementary relationship in terms of shape, size, and location with the first and second band segments 64, 66, and hence can be introduced into the design and construction of the pipe clamp 56 without imperiling the functionality of the pipe clamp 56. Moreover, this complementary relationship satisfies similar packaging demands of a pipe clamp that lacks a bridge.

Figure 4:
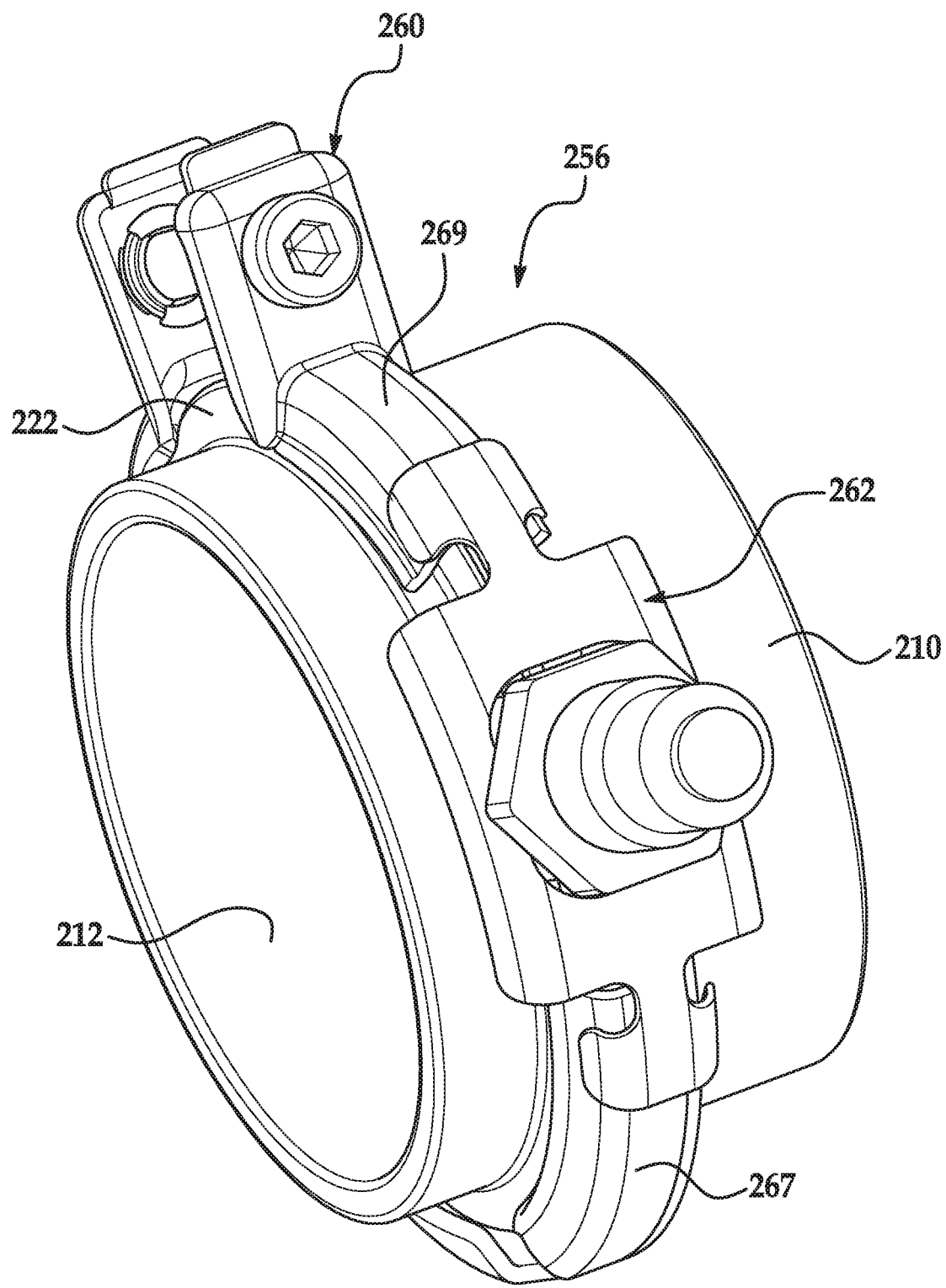
FIG. 4 is a perspective view of another embodiment of a pipe clamp and a pipe joint.
Figure 5:
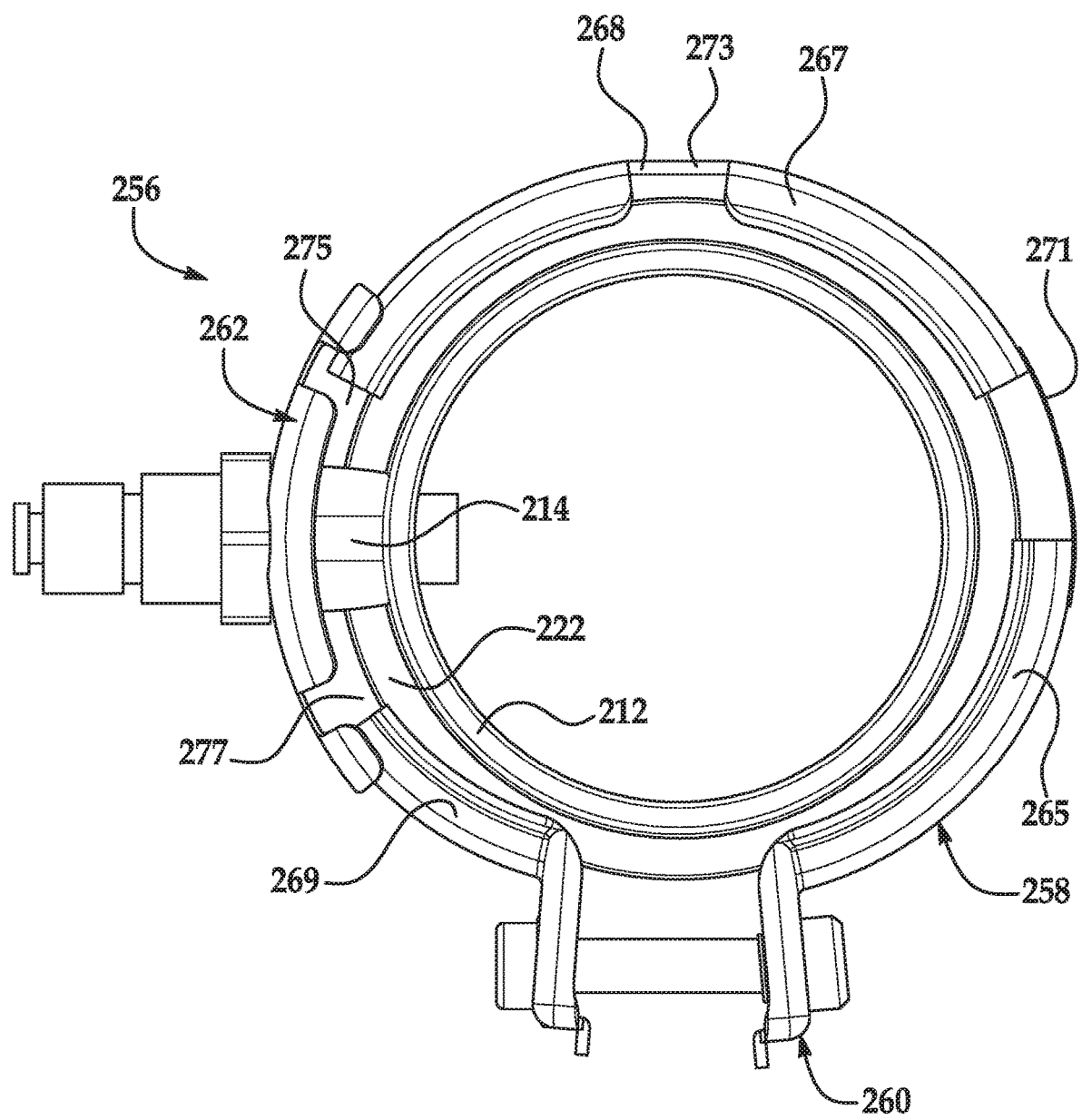
FIG. 5 is a side view of the pipe clamp and pipe joint of FIG. 4.
Figure 6:
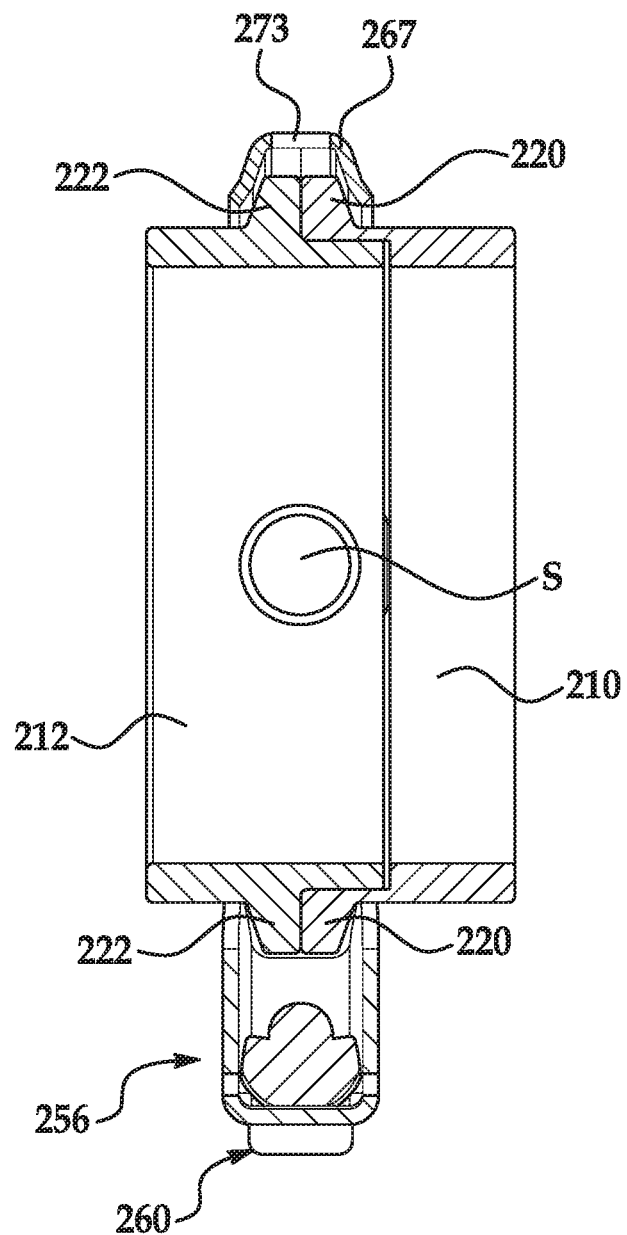
FIG. 6 is a sectional view of the pipe clamp and pipe joint of FIG. 4.

FIGS. 4-6 depict another embodiment of a pipe clamp 256. The pipe clamp 256 is similar in some ways to the pipe clamp 56 of FIGS. 1-3—such as a tightening assembly 260—and those similarities will not be repeated in this description with reference to FIGS. 4-6. Indeed, similar components between the embodiments of FIGS. 1-3 and 4-6 have reference numerals that differ by the addition of two-hundred (+200). Furthermore, a first and second pipe end 210, 212, first and second flange 220, 222, and sensor bung 214 are all the same as previously described with reference to FIGS. 1-3.

In the embodiment of FIGS. 4-6, a bridge 262 is situated ninety degrees (90°) from the tightening assembly 260 with respect to the circumference of the pipe clamp 256, as perhaps depicted best in FIG. 5. The bridge 262 has the same design as the bridge 62 of FIGS. 1-3. A band 258 includes three band segments: a first band segment 265, a second band segment 267, and a third band segment 269. The first band segment 265 and second band segment 267 are coupled together via attachments (e.g., spot-welding) to a band strip 271. The band strip 271 can be made out of sheet metal that is stamped, bent, and/or undergoes other sorts of metalworking processes. The second band segment 267 has a midsection 273 with only a base wall 268 and without the side walls previously described with reference to FIGS. 1-3. The second and third band segments 267, 269 are coupled together via separate attachments to the bridge 262. In other embodiments similar to this one, the first band segment 265 and the second band segment 267 could be combined together into a single band segment, in which case the band 258 would include a total of two band segments. Indeed, in some applications the quantity of band segments can be driven in part by manufacturability—for instance, the three band segments of the embodiment of FIGS. 4-6 with a smaller circumferential extent may be more readily manufactured via a stamping metalworking process, while band segments with a larger circumferential extent may be more readily manufactured via a rolling metalworking process.

Unlike the embodiment of FIGS. 1-3, in the embodiment of FIGS. 4-6 the circumferential ends of the second and third band segments 267, 269 adjacent the attachments to the bridge 262 are not abutted against the sensor bung 214; instead, the circumferential ends are spaced a circumferential distance away from the sensor bung 214, as perhaps demonstrated best in FIG. 5, with first and second gaps 275, 277 therebetween. The first and second gaps 275, 277 span the circumferential extent defined between the respective circumferential end of the second and third band segments 267, 269 and the respective circumferential sides of the sensor bung 214. Having the bridge 262 situated angularly closer to the tightening assembly 260 (ninety degrees versus one-hundred-and-eighty degrees) in some cases facilitates the formation of the first and second gaps 275, 277, as the tightening forces caused by the tightening assembly 260 are greater at locations angularly nearby the tightening assembly 260 than angularly farther away. That is to say, the first and second gaps 275, 277 do not compromise the establishment of sealing interfaces between the first and second flanges 220, 222 near the circumferential sides of the sensor bung 214 due to the circumferential location of the bridge 262 relative to the tightening assembly 260 and the increased tightening forces thereat. Further, the first and second gaps 275, 277 impart more circumferential contracting-flexibility in the pipe clamp 256 during rundown.

Figure 7:
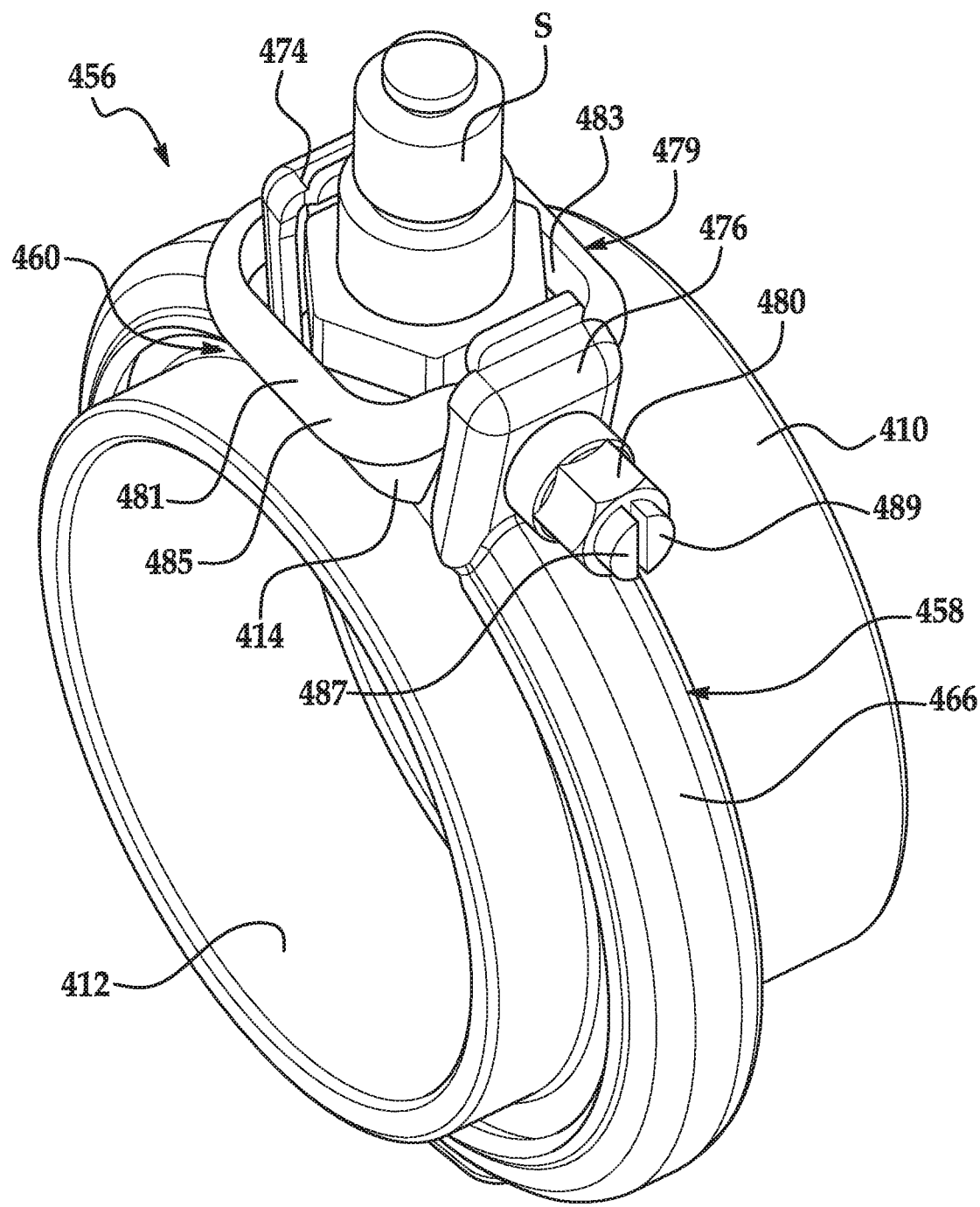
FIG. 7 is a perspective view of yet another embodiment of a pipe clamp and a pipe joint.
Figure 8:
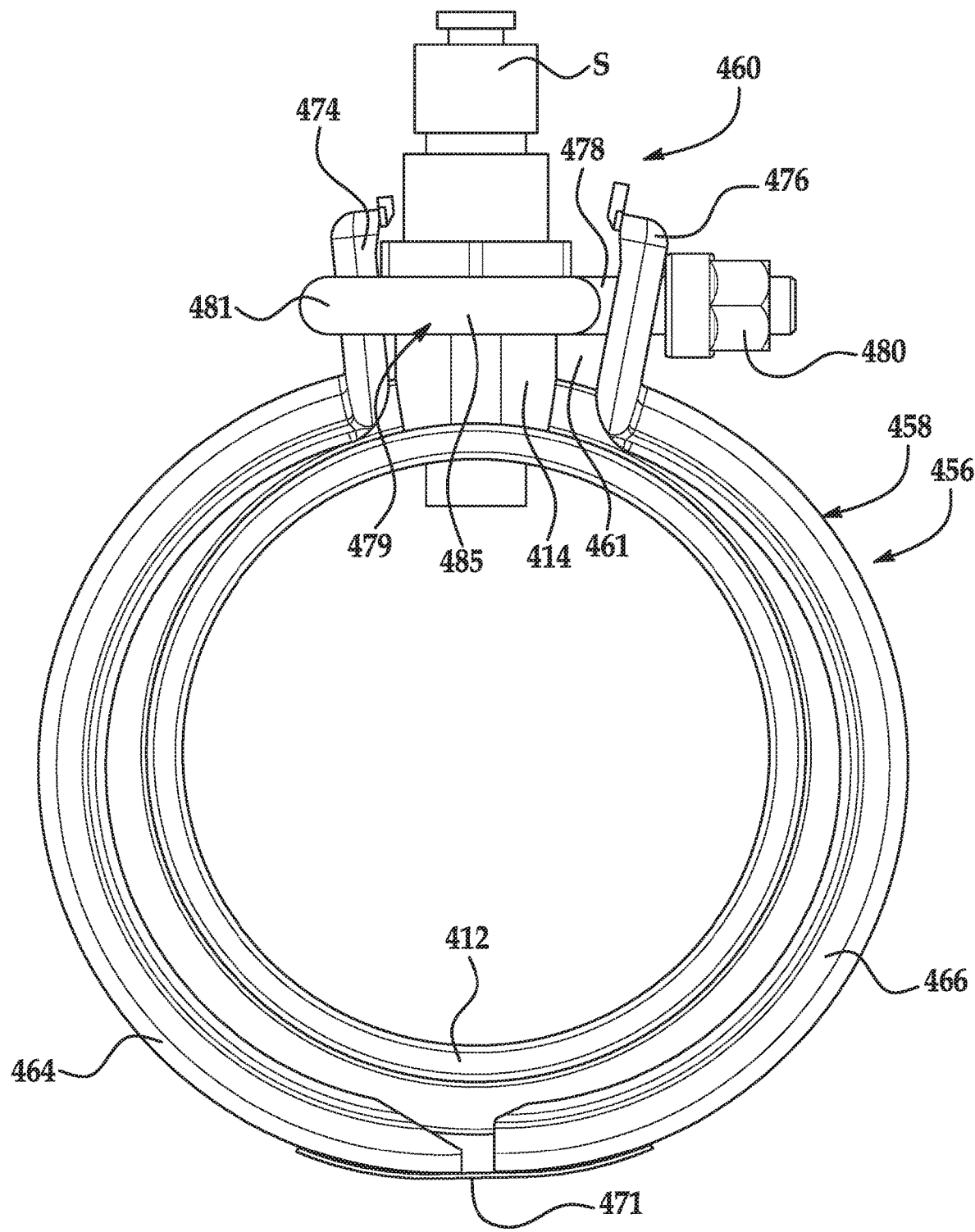
FIG. 8 is a side view of the pipe clamp and pipe joint of FIG. 7.
Figure 9:
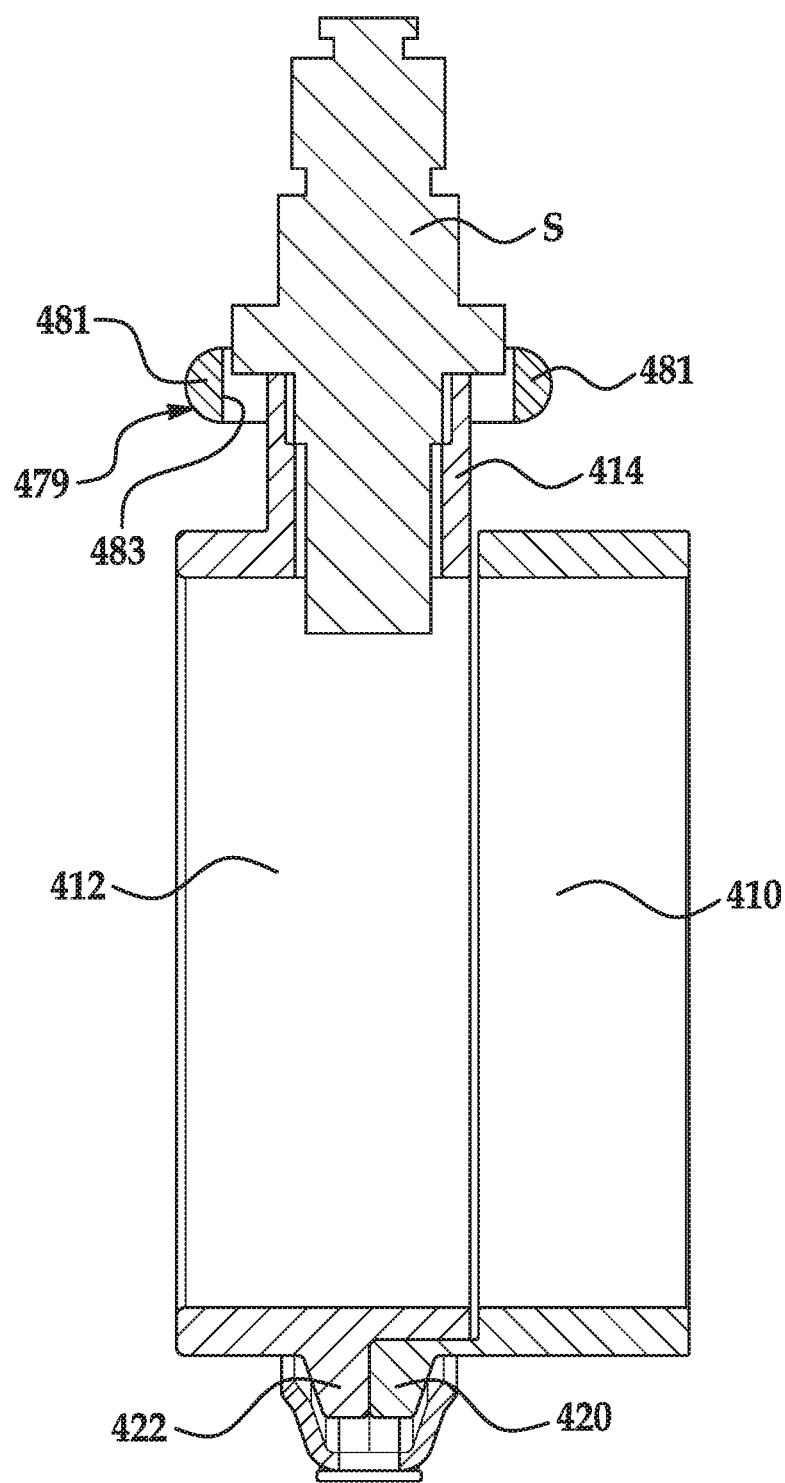
FIG. 9 is a sectional view of the pipe clamp and pipe joint of FIG. 7.

FIGS. 7-9 depict yet another embodiment of a pipe clamp 456. The pipe clamp 456 is similar in some ways to the pipe clamp 56 of FIGS. 1-3, and those similarities will not be repeated in this description with reference to FIGS. 7-9. Indeed, similar components between the embodiments of FIGS. 1-3 and 7-9 have reference numerals that differ by the addition of four-hundred (+400). Furthermore, a first and second pipe end 410, 412, first and second flange 420, 422, and sensor bung 414 are all the same as previously described with reference to FIGS. 1-3.

In the embodiment of FIGS. 7-9, a band strip 471 couples a first and second band segment 464, 466 together via attachments (e.g., spot-welding) thereto. Unlike the previous embodiments of FIGS. 1-3 and FIGS. 4-6, the pipe clamp 456 of the embodiment of FIGS. 7-9 lacks a bridge. Instead, the sensor bung 414 and sensor S are accommodated via a tightening assembly 460. Accommodation at the tightening assembly 460 can in some cases more readily satisfy packaging demands in a given application since the tightening assembly's size and location are oftentimes already accounted for when packaging constraints are determined. This location also facilitates servicing of the sensor bung 414 and sensor S, as servicing of the tightening assembly is already a consideration in the design of the pipe joint. A spacing 461 defined in part within the circumferential extent spanning between a first lug 474 and a second lug 476 receives the sensor bung 414 and the sensor S when the pipe clamp 456 is placed on the first and second pipe ends 410, 412 and at the first and second flanges 420, 422. The tightening assembly 460 in this embodiment includes a bolt 479 and a nut 480.

The bolt 479 helps bring the first and second lugs 474, 476 toward and away from each other in order to tighten and loosen a band 458 around the first and second flanges 420, 422. The bolt 479 can have different designs and constructions in different embodiments. In the embodiment of FIGS. 7-9, the bolt 479 is a unitary piece with a threaded shank 478 and an extension 485. Unlike bolt shanks in previously-known pipe clamps, the threaded shank 478 is split into a pair of halves—a first half 487 and a second half 489. The first half 487 has a half-circle shape in cross-sectional profile and is threaded on its outer arced surface, and likewise the second half 489 has a half-circle shape in cross-sectional profile and is threaded on its outer arced surface. In assembly, the nut 480 is tightened down over the first and second halfs 487, 489 and brings them together as perhaps illustrated best in FIG. 7. The extension 485 is a monolithic elongation of the threaded shank halfs 487, 489 and has a generally oval shape with a body 481 surrounding an empty central region. The body 481 spans around both axial sides of the sensor bung 414 and in turn around the sensor S, as perhaps illustrated best in FIG. 9, and spans around an outside of the first lug 474. To provide room for circumventing obstruction between the extension 485—or more principally the tightening assembly 460—and the sensor bung 414 and sensor S, a clearance 483 is defined within the body 481 and constitutes the body's empty central region. The clearance 483 receives introduction of the sensor bung 414 when the pipe clamp 456 is placed on the first and second pipe ends 410, 412 and at the first and second flanges 420, 422. The clearance 483 also receives the first lug 474 as the body 481 spans around the outside thereof. The clearance 483 is defined and delimited by internal edges of the body 481.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A pipe joint, comprising:
a first pipe end having a first flange that extends at least partly therearound;
a second pipe end having a second flange that extends at least partly therearound, said second pipe end having a sensor bung; and
a pipe clamp situated on said first and second pipe ends and at said first and second flanges, said pipe clamp comprising:
a band having at least a first band segment and a second band segment;
a bridge spanning between said first and second band segments and attached to said first and second band segments, said bridge having a clearance to accommodate said sensor bung, to accommodate a sensor disposed in said sensor bung, or to accommodate both said sensor bung and said sensor; and
a fastener to tighten said pipe clamp on said first and second pipe ends;
wherein, in installation, said band is tightened over said first and second flanges and said clearance of said bridge receives said sensor bung, receives the sensor, or receives both said sensor bung and said sensor.

2. The pipe joint of claim 1, wherein said sensor bung resides on said second pipe end adjoining said second flange and interrupts the circumferential extent of said second flange around said second pipe end.

3. The pipe joint of claim 1, wherein an outer surface of said sensor bung constitutes a free end surface of said second pipe end at a circumferential zone of said second pipe end that is occupied by said sensor bung.

4. The pipe joint of claim 1, wherein a first sealing interface is established between surfaces of said first and second flanges, and a second sealing interface is established between a free end surface of said first pipe end and a surface of said sensor bung.

5. The pipe joint of claim 1, wherein said bridge is situated approximately one-hundred-and-eighty degrees (180°) relative to said fastener with respect to a circumference of said pipe clamp.

6. The pipe joint of claim 1, wherein said bridge is situated approximately ninety degrees (90°) relative to said fastener with respect to a circumference of said pipe clamp.

7. The pipe joint of claim 1, wherein said first pipe end has a step formed therein, and a primary sealing interface is established between a free end surface of said second pipe end and a confronting surface of said step and is established between a free end surface of said first pipe end and an outer surface of said sensor bung.

8. The pipe joint of claim 7, wherein said step is formed on an underside of said first pipe end.

9. The pipe joint of claim 7, wherein said primary sealing interface constitutes the sole surface-to-surface confronting interface between said first and second pipe ends that spans circumferentially-continuously around said first and second pipe ends.

10. The pipe joint of claim 1, wherein said first band segment has a first lug depending generally radially outboard thereof, and said second band segment has a second lug depending generally radially outboard thereof, said fastener being received through said first and second lugs.

11. The pipe joint of claim 1, wherein said clearance of said bridge is defined by internal edges of a body portion of said bridge.

12. The pipe joint of claim 11, wherein said clearance is defined wholly by the internal edges of said body portion of said bridge and is delimited thereby.

13. The pipe joint of claim 1, wherein said band has a third band segment, and said band includes a band strip attached to said third band segment and attached to said first band segment or to said second band segment.

14. A pipe clamp, comprising:
   a v-band having at least a first band segment and a second band segment, and having a first lug and a second lug;
   a bridge spanning between said first and second band segments and attached to said first and second band segments, said bridge having a clearance to accommodate a sensor bung of a pipe end, to accommodate a sensor disposed in the sensor bung, or to accommodate both the sensor bung and the sensor, said bridge having a first circumferential end portion attached to a circumferential end of said first band segment, said bridge having a second circumferential end portion attached to a circumferential end of said second band segment; and
   a tightening assembly including a fastener used to bring said first and second lugs toward each other to tighten the pipe clamp;
   wherein, when installed on pipe ends, said clearance of said bridge receives the sensor bung, receives the sensor, or receives both the sensor bung and the sensor.

15. The pipe clamp of claim 14, wherein said bridge is situated approximately one-hundred-and-eighty degrees (180°) relative to said tightening assembly with respect to a circumference of the pipe clamp.

16. The pipe clamp of claim 14, wherein said bridge is situated approximately ninety degrees (90°) relative to said tightening assembly with respect to a circumference of the pipe clamp.

17. The pipe clamp of claim 14, wherein said clearance of said bridge is defined by internal edges of a body portion of said bridge.

18. The pipe clamp of claim 17, wherein said clearance is defined wholly by the internal edges of said body portion of said bridge and is delimited thereby.

19. The pipe clamp of claim 14, wherein said first circumferential end portion has a first base wall and a pair of first side walls extending from said first base wall, and said second circumferential end portion has a second base wall and a pair of second side walls extending from said second base wall.

20. The pipe claim of claim 14, wherein said bridge has a main body portion, a first neck portion, and a second neck portion, said first neck portion extending between said first circumferential end portion and said main body portion, and said second neck portion extending between said second circumferential end portion and said main body portion.

* * * * *